Aug. 21, 1928.
J. W. WINTER
1,681,604
ELECTRIC WELDING MECHANISM
Filed June 6, 1924
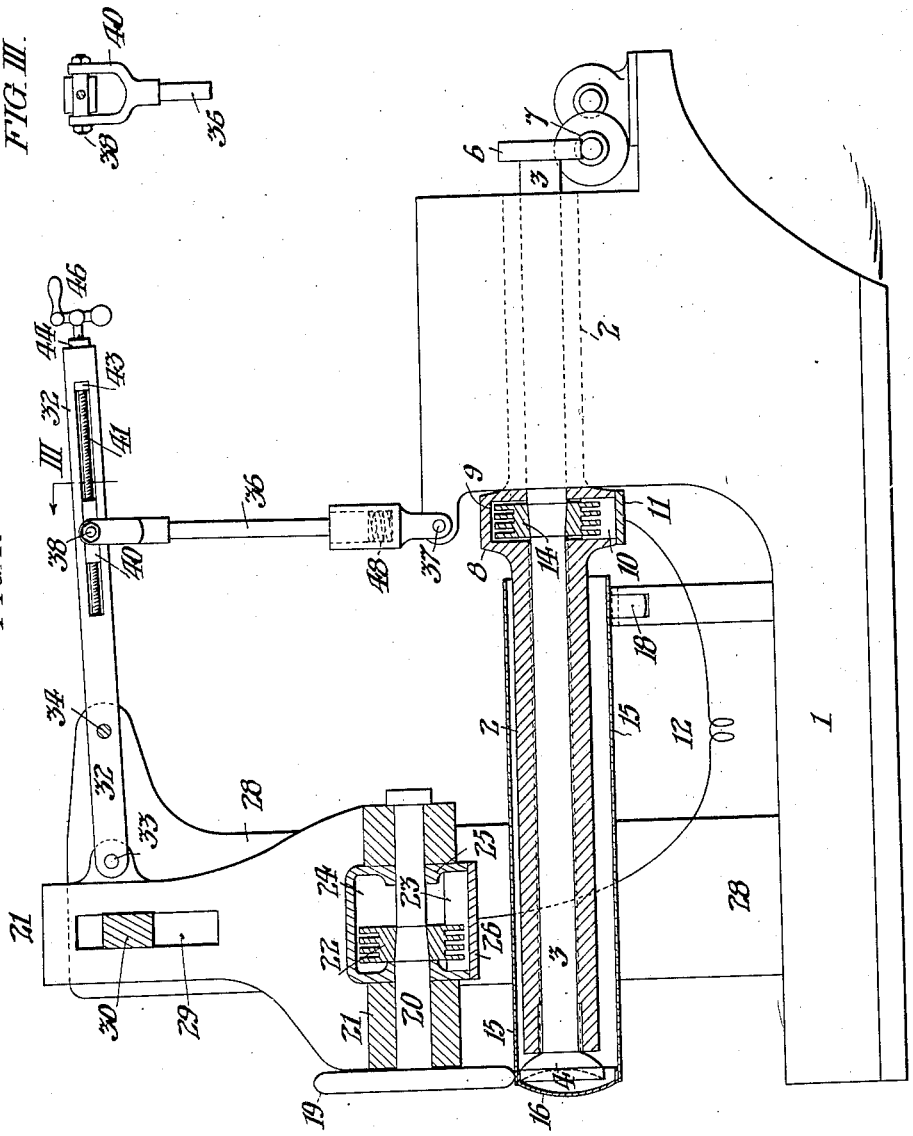
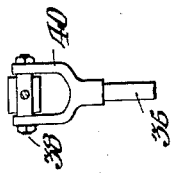
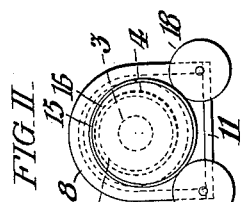

Patented Aug. 21, 1928.

1,681,604

UNITED STATES PATENT OFFICE.

JOSEPH WILLIAM WINTER, OF PENFIELD, PENNSYLVANIA, ASSIGNOR TO JOHN WOOD MANUFACTURING COMPANY, OF CONSHOHOCKEN, PENNSYLVANIA, A CORPORATION OF PENNSYLVANIA.

ELECTRIC WELDING MECHANISM.

Application filed June 6, 1924. Serial No. 718,208.

As hereinafter described, my invention is particularly applicable to welding mechanism of the low voltage type adapted to seal the respectively opposite end closures in kitchen range boilers by welding such closures at their junctions with their cylindrical boiler shells; the current being directed within and without the boilers by respective rotary disk terminals which respectively roll upon the metal of the closure and said shell. For instance, in the form of my invention hereinafter described; electric energy is supplied at 2200 volts and transformed twice, by similar transformers in which the primary and secondary coils are in the proportion of one hundred to one. The first step of transformation is from 2200 down to a nominal 220 volts, although in practice it fluctuates from 160 to 430 volts. The terminals of the secondary coil in that first transformer are connected to the terminals of the primary coil in the second transformer. The second transformation is from the nominal 220 to a nominal 2.2 volts. However, the latter also fluctuates from 1.6 to 4.3 volts in the welding circuit. The resultant energy actually used in the welding circuit fluctuates between 15,000 and 35,000 watts.

Great difficulty has been experienced in maintaining such circuit at the connections between the secondary coil of the second transformer and said rotary terminals of the welding circuit. Heretofore, such connection has been effected by stationary solid metallic contact brushes bearing upon the rotary terminals, but it is practically impossible to entirely suppress sparking at such contacts and, consequently, they are rapidly eroded and destroyed. Therefore, the object and effect of this invention is to avoid the use of such solid contacts and eliminate the sparking by substituting therefor liquid connectors between the respective rotary electrodes and said secondary transformer coil. As hereinafter described, such liquid connectors are respective pools of mercury into which dip rotary contact members which turn with the rotary terminals aforesaid.

My invention includes the various novel features of construction and arrangement hereinafter more definitely specified.

In said drawings: Fig. I is a diagrammatic view, partly in elevation and partly in section, showing a range boiler welding machine conveniently embodying my invention.

Fig. II is a partial and diagrammatic elevation of the left hand end of the mechanism as shown in Fig. I, showing the relation of the rotary electrodes and the work.

Fig. III is a fragmentary sectional view, taken on the line III in Fig. I, showing the construction and arrangement of the upper end of the adjustable strut.

In said figures, 1 is the machine base in which is rigidly mounted the tubular bearing 2 for the driving shaft 3 of the welding circuit electrode 4. Said shaft 3 may be rotated by any suitable means but is conveniently provided at its right hand end with the worm gear 6 driven by the worm 7. Said bearing 2 has the enlargement 8 to form the chamber 9 for the pool of mercury 10 which rests upon the terminal 11 of the secondary coil 12 of the transformer in which the energy for the welding operation is induced as above described. The current passes from said mercury pool 10 to said shaft 3, through the rotor 14 which is tightly fitted upon said shaft and is conveniently laminated or corrugated as indicated, so as to afford the desired area of contact with the mercury.

As indicated in Fig. I; a range boiler shell 15, conveniently formed of a primarily plane sheet of steel, rolled to cylindrical form and welded at its abutted edges, has the end closure 16, also conveniently formed of pressed sheet metal, fitted in the end of said shell 15 in the position in which it is desired to unite said closure to said shell. I find it convenient to support the work in the eccentric position with respect to said shaft 3 shown in Fig. II, by resting the inner end of said shell 15 upon a pair of idle bearing rollers 18 which are conveniently supported by said machine base 1. Said closure 16 rests upon said rotary electrode 4 beneath the opposite rotary electrode 19 which bears upon the outer cylindrical surface of said shell 15. Said electrode 19 is carried by the shaft 20 journaled in the bearing 21 and carrying the rotor 22 which dips into the pool of mercury 23 in the chamber 24 in the casing 25; which latter is rigidly secured to said base 21. Said mercury 23 rests upon the other terminal 26 of said secondary coil 12 so as to complete the welding circuit through said coil which is the source of electrical energy in the arrangement shown.

Said bearing 21 is adjustable vertically in the housing comprising opposite standards 28 which are rigidly connected with said machine base 1. Said bearing 21 has the vertical slot 29 and is guided and retained in substantially vertical position, by the cross bar 30 which extends through said slot 29 between two opposite standards of said housing 28 only one of which is shown in Fig. I. Said bearing 21 is arranged to be raised and lowered with respect to the work by means of the lever 32 which is pivotally connected thereto at 33 and fulcrumed at 34 in said housing standards 28. When the mechanism is in the operative position shown in Fig. I; said lever 32 is upheld by the adjustable strut 36 which has its lower end pivoted at 37 to said base 1 and has its upper end pivotally connected at 38 to the nut 40 which is adjustable toward and away from the fulcrum 34 of said lever, by means of the screw 41 which is mounted to rotate in said lever 32 but is prevented from axial movement therein by the collars 43 and 44. Said screw 41 is conveniently provided with the handle 46, by which it may be rotated, and it is to be understood that the construction and arrangement of the parts are such that said lever 32 may be tilted to raise and lower the rotary electrode 18 with respect to the work 16 by rotation of said screw 41 to shift said nut 40 longitudinally on said screw toward and away from said fulcrum 34 of said lever 32. Moreover, I find it convenient to make said strut in two sections in telescopic relation with each other and interpose between them the spring 48 to resiliently press said rotary electrode 19 toward the rotary electrode 4 and thus elastically grip the work 15, 16 between said electrodes.

Of course, a more intimate connection is made between the rotors aforesaid and the mercury, if said rotors are made of copper, bronze or other metal capable of amalgamating with the mercury. However, such amalgamation which, of course, involves progressive disintegration of the metal of the rotors, may be avoided by forming the rotors of steel or other ferric metal. Similarly, a more intimate electrical connection between the mercury and said terminals 11 and 26 is effected if the metal of the terminals is susceptible of such amalgamation, but the structure is rendered more durable if such connection is effected without amalgamation.

Although I have described mercury as a typical liquid connecting medium between the stationary terminals and said rotors; it is to be understood that any other suitable liquid may be employed.

Moreover, although in the embodiment of my invention above described, I have found it convenient to directly connect a transformer secondary coil in the welding circuit; it is to be understood that said circuit may be otherwise constructed and arranged to derive electrical energy from any suitable source.

Therefore, I do not desire to limit myself to the precise details of construction and arrangement herein set forth, as it is obvious that various modifications may be made therein without departing from the essential features of my invention, as defined in the appended claims.

I claim:

1. In electric welding apparatus, the combination with a stationary frame; of a rotary electrode shaft journaled upon a substantially horizontal axis in said frame; a rotary electrode carried by said shaft, at the end of said shaft remote from said frame; a pair of idle bearing rollers, in transversely spaced relation, below said shaft, adjoining said frame and remote from said electrode; whereby tubular bodies to be welded, of different diameters, may be exteriorly supported at one end by said idle rollers and interiorly supported at the other end by said electrode and in cooperative contact but eccentric relation with the latter; a second rotary electrode, mounted upon a shaft with its axis in substantially parallel relation with the axis of said first electrode; means carrying said second electrode and its shaft, adjustable toward and away from said first electrode; whereby the article to be welded may be gripped between and turned by frictional engagement with said electrodes.

2. In apparatus as in claim 1, a tubular bearing for the first electrode shaft, extending in the article to be welded and forming an electrical conductor in frictional engagement with said shaft.

3. Apparatus as in claim 1, wherein each of said electrode shafts is connected with the welding circuit through respective pools of mercury, which are relatively movable toward and away from each other, in accordance with the relative adjustments of said shafts.

4. Apparatus as in claim 1, wherein each of the eletrode shafts has a conical portion fitting a conical seat in an electric contact rotor; each of said rotors having a plurality of flanges extending in parallel planes transversely to the axis of the rotor; and the welding circuit is connected with said rotors through respective pools of mercury extending between said rotor flanges; said pools being relatively movable with the respective rotor shafts.

5. In electric welding apparatus, the combination with a horizontal shaft having a conical portion; of a rotor having a conical seat fitted to said shaft; said rotor including a plurality of closely spaced parallel flanges extending transversely to the axis of the rotor; and a pool of mercury in the welding circuit and extending between said flanges;

whereby the maximum area of contact surface is afforded in a given space.

6. Apparatus as in claim 5, wherein the rotor is formed of metal amalgamating with the mercury; whereby a better electrical contact is made with said rotor than if the latter were made of a metal incapable of amalgamation.

In testimony whereof, I have hereunto signed my name at Conshohocken, Pennsylvania, this twenty-ninth day of May, 1924.

JOSEPH WILLIAM WINTER.